Sept. 8, 1942.  H. L. PRESCOTT  2,295,355
ELECTRICAL APPARATUS
Filed Feb. 18, 1941
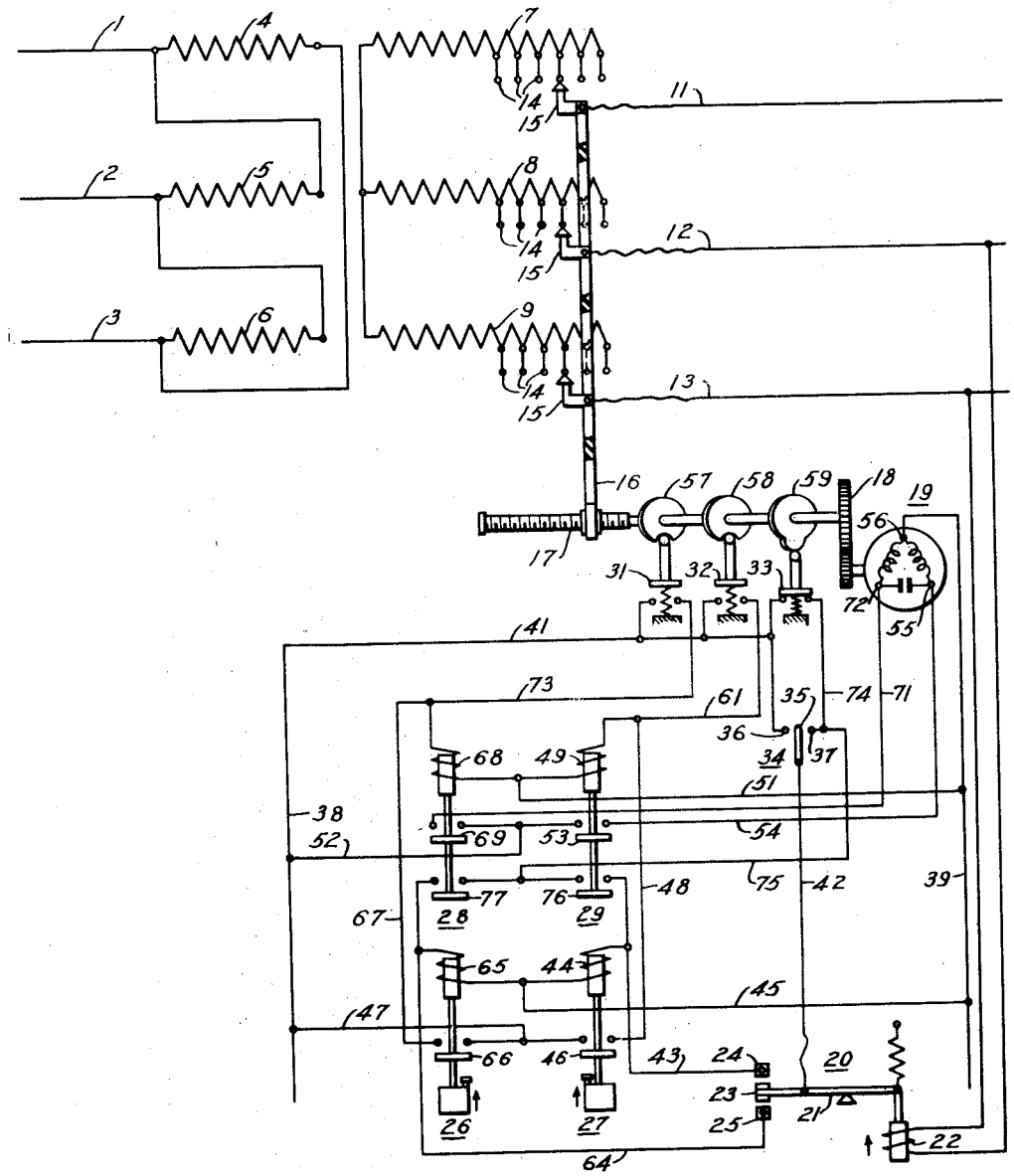
WITNESSES:
INVENTOR
Herbert L. Prescott.
BY
Franklin E. Hardy
ATTORNEY Patented Sept. 8, 1942

2,295,355

UNITED STATES PATENT OFFICE 2,295,355

ELECTRICAL APPARATUS

Herbert L. Prescott, Sharon, Pa., assignor to Westinghouse Electric & Manufacturing Company, East Pittsburgh, Pa., a corporation of Pennsylvania Application February 18, 1941, Serial No. 379,470

6 Claims. (Cl. 171—119)

My invention relates to electrical regulating systems having a step-by-step operating characteristic, and more particularly to improvements in the control of such automatic electrical regulating systems.

In many automatic electrical regulator systems employing step type equipment such as under load tap changers for transformers, it is desirable in certain instances that the tap changing mechanism, when once set in operation, continue its operation continuously through a number of operating steps of the equipment until the controlled circuit characteristic being regulated has reached its desired value.

In other instances it is desirable that the tap changing mechanism operate continuously for one step only corresponding to one tap change, thus effecting a time delay between successive steps in the operating mechanism so that if the correction required is such as to cause the equipment to operate through several tap changing steps, each step in the operation will be initiated separately by the primary control element after the previous step is completed. The first mentioned operating characteristic provides a more rapid change in the regulated quantity while the second mentioned operating characteristic of the equipment provides sufficient time between each operating step of the mechanism to permit the circuit conditions resulting from a particular step to establish themselves before the next step is initiated and thus frequently avoids the operation of the mechanism through an undesired step.

It is an object of my invention to provide means for selectively conditioning set type regulating equipment automatically controlled in accordance with an electrical characteristic of a circuit so as to effect either a continuous operation of the mechanism until the desired change in the regulated quantity has been accomplished, or to effect a step-by-step operation thereof consisting of a series of separate operations with time delays between each operating step.

Other objects and advantages of the invention will be apparent from the following description of one preferred embodiment thereof, reference being had to the accompanying drawing in which the single figure is a diagrammatic view of apparatus and circuits illustrating the said embodiment of the invention.

Referring to the drawing, conductors 1, 2 and 3 represent a three-phase alternating current power circuit connected to primary transformer windings 4, 5 and 6 that are inductively related to secondary windings 7, 8 and 9 through which energy is supplied to the three-phase circuit represented by secondary conductors 11, 12 and 13. A tap changing mechanism is provided for varying the voltage ratio between the primary circuit conductors 1, 2, 3 and the secondary circuit conductors 11, 12, 13 which is diagrammatically illustrated as comprising a plurality of tap changing switch contact members 14 connected to the tapped points in the secondary windings 7, 8 and 9, and cooperating with movable switch contact members 15 in each of the three phases that are similarly operated by mechanism illustrated as an arm 16 controlled by a screwthreaded shaft 17 that is operated through suitable mechanical means 18 by a motor 19.

Control equipment for the tap changing mechanism is provided comprising a circuit controller element or primary relay 20 having a pivoted arm 21 and armature controlled by an operating winding 22 connected to secondary circuit conductors 12 and 13 for effecting engagement of the movable contact member 23 with the one or the other of fixed contact members 24 or 25 as the voltage between conductors 12 and 13 drops below or rises above the desired value. The primary relay 20 controls the operation of the motor 19 in the one or the other direction by energizing the one or the other of two timing relays 26 or 27 which, in turn, control secondary or motor controlling relays 28 and 29. Three cam operated switches 31, 32 and 33 are provided and are operated in accordance with the operation of the tap changing mechanism, and a selector switch 34 is provided having two operating positions for selecting the desired operating characteristic of the regulating system.

If the switch blade 35 of switch 34 is closed to engage the contact member 36, the equipment will operate continuously through a series of tap changing steps as determined by the position of the primary relay 20 in the following manner. The conductors 38 and 39 represent a source of alternating current energy for operating the motor 19 and the several relays controlling its operation.

If the voltage of the secondary circuit drops below the desired value the energization of the primary relay winding 22 is decreased permitting the armature to drop and the movable contact 23 to engage the contact 24, thus closing a circuit extending from supply conductor 38 through conductor 41, switch contact members 36 and 35, conductor 42, primary relay contact members 23 and 24, conductor 43, the winding 44 of the timing relay 27, and conductor 45 to the supply conductor 39. The timing relay 27 has a time-delay closing characteristic so that it will not close immediately but if the above traced circuit remains energized for a predetermined interval of time, the relay will operate to close a circuit through its contact member 46 which may be traced from supply conductor 38 through conductor 47, switch contact member 46, conductor 48, winding 49 of the secondary relay 29 and by conductor 51 to the supply conductor 39, thus causing the secondary relay 29 to operate promptly to a circuit closing position to energize the motor 19 to operate in a direction for operating the tap changing mechanism to increase the voltage on the secondary conductors 11, 12, 13. This motor energizing circuit may be traced from the supply conductor 38 through conductor 52, secondary relay contact member 53, conductor 54 to the motor terminal 55 and from the motor terminal 56 to supply conductor 39.

It will be noted that in the illustrated position of the tap changing mechanism, that is, on a tap changing position, the switches 31 and 32 are in their open position and the switch 33 is in its closed position.

When the secondary relay 29 closes to operate the motor 19 to move the tap changing contact members 15 from engagement with one set of tap changing switch contact members 14 to an adjacent one of the series, a sealing in circuit is established between conductors 38 and 39 through conductor 41, switch contact 33, conductors 74 and 75, contact member 76, of the secondary relay 29, the timing relay coil 44 and conductor 45. As soon as the motor 19 starts to rotate, the cams 57, 58 and 59 would likewise start to move, but there will be a short time interval after the motor and cams start to move before this motion is enough to close the switch 32 to close a "sealing in" circuit through the winding 49 of the closed secondary relay. If during this interval the voltage of the power circuit 11, 12 and 13 should be restored so that the primary relay 20 opens its contacts 23, 24, the above traced "sealing in" circuit through the switch contact 33 and the timing relay coil 44 will hold the timing relay 27 closed until after the switch 32 has been closed.

The switch 32 closes a circuit from supply conductor 38 through conductor 41, switch 32, conductor 61, the winding 49 of the secondary relay 29 and conductor 51 to the supply conductor 39, thus maintaining the secondary relay 29 in its energized or circuit closing position independently of the interruption of the circuit through the contact members 23 and 24 of the primary relay 20, or the circuit through the switch 33, until the tap changing mechanism has operated through one tap changing step corresponding to one revolution of the shaft carrying the cams 57, 58 and 59. This is for the purpose of insuring that the tap changing mechanism, once its operation has been initiated by the primary relay 20, continues through a tap changing step independently of a change in the secondary circuit conditions that may cause the contact members of the relay 20 to separate.

If the above-described "sealing in" circuits were not provided and if the primary relay 20 should operate to interrupt the circuit through its contact members during the interval after the secondary relay 29 had closed but before the cam 58 had moved upwardly to close the switch 32, the tap changer would stop in a position between completion of full tap cycle operations which is undesirable. The sealing in circuit through switch 33, together with the second sealing in circuit through switch 32 insures that once the secondary relay 29 has been closed the tap changer will start and will continue to operate until the next tap changing position has been reached.

If, however, the voltage of the secondary circuit remains low, that is, below its desired value, the contact members 23 and 24 remain in engagement, the relays 27 and 29 will remain energized and in their circuit closing positions thus continuing the operation of the motor 19, until a sufficient change in the secondary circuit voltage has taken place to increase the energization of the primary relay winding 22 so as to separate the contact members 23 and 24. Upon such separation the timing relay 27 immediately drops to its circuit interrupting position, the energization of the winding 49 of the relay 29 being continued by the cam switch 32 until the tap changing operation last initiated is completed, under which condition the energization of the secondary relay is interrupted by the cam switch 32.

If, on the other hand, the voltage of the secondary circuit conductors 12 and 13 rises above its desired value, the increased energization of the winding 22 of the primary relay 20 will cause the relay contact members 23 and 25 to engage, thus operating the timing relay 26 and the secondary relay 28 to effect operation of the motor 19 in the opposite direction to reduce the voltage applied to the secondary circuit conductors 11, 12 and 13. Engagement of the primary relay contact members 23 and 25 completes a circuit between conductors 42 and 45 through conductor 64, and the winding 65 of the timing relay 26. If this circuit is maintained for a predetermined time corresponding to the time-delay closing characteristic of the relay 26, its contact member 66 will be actuated to a circuit closing position, thus completing a circuit between conductors 41 and 51 through conductor 67 and the winding 68 of the secondary relay 28, causing the relay 28 to be moved to its circuit closing position and complete a circuit through contact member 69 and conductor 71 to the motor terminal 72, and from the terminal 56 to supply conductor 39, thus causing the motor 19 to operate the tap changing mechanism in a direction to lower the secondary circuit voltage.

As soon as the secondary relay 28 is operated to its circuit closing position, a "sealing-in" circuit for the timing relay 26 is completed through conductor 41, switch contact 33, conductors 74 and 75, contact member 77 of the relay 28, the coil 65 of the timing relay 26 and conductor 45. When the motor 19 and the tap changing mechanism start to move, the cams 57, 58 and 59 would likewise be moved and prior to interruption of the above traced "sealing in" circuit for the timing relay 26 through the switch 33, a "sealing in" circuit for the secondary relay 28 is closed through the switch 31. This circuit extends from conductor 38 through conductor 41, switch 31, conductor 73, secondary relay winding 68, and conductor 51 to conductor 39, thus insuring that once the relay 28 has been operated to its closed position the tap changing mechanism will operate to the next position.

So long as the primary relay contact members 23 and 25 are maintained in their circuit closing position the timing relay 26 and the secondary relay 28 remain energized to continue the operation of the tap changing mechanism through a sufficient number of tap changing steps to re-establish the desired voltage and cause the primary relay contact members 23 and 25 to separate. Upon separation of the primary relay contact members, the timing relay 26 immediately drops to its circuit interrupting position, the energization of the secondary relay 28 being maintained through the cam switch 31 until the last initiated tap changing step has been completed.

If it is desired that the regulating system operate in a step-by-step manner, that is, so as to stop at each tap changing position, the switch blade 35 of the selector switch 34 is moved to engage the switch contact member 37 so that the circuit from the supply conductor 38 to the primary relay 20 is completed through conductor 41, cam switch 33, conductor 74, switch contact members 37 and 35 and conductor 42 which circuit is closed when the tap changing mechanism is on any tap position.

If the voltage between the secondary circuit conductors 12 and 13 varies from the desired value, the relay contact member 23 of the primary relay 20 will engage the one or the other of the contact members 24 and 25 to energize the corresponding winding 44 or 65 of the associated timing relay 27 or 26 through the above traced circuit from supply conductor 38 through the cam switch 33. The operation of the timing relay 27 or 26 to its circuit closing position will effect operation of the secondary relay 29 or the secondary relay 28 to its circuit closing position through the circuits above described, to effect the operation of the motor 19 in the one or the other direction to effect the desired correction in the secondary circuit voltage. Immediately upon operation of one of the secondary relays 28 or 29 to its circuit closing position, and before the cam switches 31 and 32 have been actuated to their circuit closing positions to effect a sealing circuit for the winding 68 or 49, a sealing circuit is provided from conductor 38 through conductor 41, cam switch 33, conductors 74 and 75, and the sealing contact member 76 of the secondary relay 29, or the sealing contact member 77 of the secondary relay 28, to maintain the timing relay 27 or the relay 26 in its circuit closing position independently of the primary relay 20, until the operation of the tap changing mechanism has started and the cam switches 31 and 32 have closed to maintain the secondary relay 28 or 29 in its circuit closing position throughout the next tap changing operation. Immediately after the tap changing mechanism starts to operate in the one direction or the other and the sealing-in cam switches 31 and 32 have been operated to their circuit closing positions, the cam switch 33 is operated to its circuit interrupting position, and, when the switch contact member 35 of the selector switch 34 is in engagement with the contact member 37, the cam switch 33 interrupts both the sealing-in circuit through the secondary relay contact member 76 or 77 and also the initiating circuit through conductor 42 and the primary relay 20, thus deenergizing the timing relay winding 65 or 44, and permitting the timing relay to reset to its circuit-interrupting position. In this position of the timing relay, the closed secondary relay 28 or 29 will become deenergized upon the completion of a tap changing cycle and movement of the sealing-in cam switches 31 and 32 to their circuit interrupting position. If the primary relay 20 maintains its contact members in engagement to effect a further operation of the mechanism in the same direction, this operation will again start as soon as the time interval necessary for the timing relay 26 or 27 to operate to a circuit closing position has elapsed. The operation of the tap changing mechanism will thus continue through as many tap changing steps as required to so adjust the secondary voltage as to separate the primary relay contact members, and thus interrupt the initiating circuit for effecting further operation of the equipment at the primary relay 20.

It will be noted that the time interval between the closing of the cam switch 33 and the opening of the cam switches 31 and 32 is insufficient to maintain a circuit through the sealing-in contacts 77 or 76 of the secondary relays for a sufficient length of time to cause the timing relay 26 or 27 to again close its contacts, so that the timing relay must be operated to its circuit closing position for each tap changing step through the contact members of the primary relay 20.

It will be apparent to those skilled in the art that modifications in the circuits and apparatus illustrating a preferred embodiment of my invention will occur to those skilled in the art, without departing from the spirit of the invention, and I do not wish to be limited otherwise than by the scope of the appended claims.

I claim as my invention:

1. In combination, apparatus having an operating condition to be regulated, regulating means for regulating said condition in steps, control equipment for said regulating means including a circuit controller responsive to the value of said condition for initiating the operation of said regulating means, and means for selectively conditioning the control equipment for interrupting the operation of said regulating means either upon the completion of each step of operation of the regulating means independently of the position of said circuit controller, or only upon a completion of the number of steps required as determined by said circuit controller.

2. In a step type regulator, a circuit controller responsive to variations from normal value of a regulated condition which exceeds in magnitude a regulating step, control means controlled by said controller for initiating a correction in the regulated condition, and means for selectively conditioning the control means for effecting either a continuous operation of said regulator until interrupted by operation of said controller or a step-by-step operation of said regulator for introducing a time delay between successive steps independently of the operation of said controller.

3. In a step type regulating system, apparatus having a quantity to be regulated, regulating means including motor operated mechanism for regulating said quantity in steps, control means for said regulating means including a primary relay responsive to the value of the quantity to be regulated, additional relays and control circuits controlled by said primary relay for initiating the operation of said regulating means, and means for selectively conditioning the control equipment for interrupting the operation of said regulating means either upon the completion of each step of operation independently of the position of said primary relay, or only upon a completion of a number of steps as determined by said circuit controller.

4. In a step type regulating system, apparatus having a quantity to be regulated, regulating means including motor operated mechanism for regulating said quantity in steps, control means for said regulating means including a primary relay responsive to the value of the quantity to be regulated and additional means including control circuits controlled by the primary relay for initiating the operation of said motor operated mechanism, switches controlled by operation of the motor operated mechanism for sealing in the above-named control circuits for effecting continued operation of the mechanism throughout one operating step, said primary relay also being effective for maintaining the control circuits closed past successive operating steps when required for completion of a correction of the regulated quantity, switch means controlled by operation of the motor operated mechanism for interrupting the control circuits after each operating step of the mechanism, and means for selectively conditioning the control means for effecting either continuous operation as determined by the primary relay, or an interruption of the operation of the mechanism after each operating step.

5. In a step type regulating system, apparatus having a quantity to be regulated, regulating means including motor operated mechanism for regulating said quantity in steps, control means for said regulating means including a primary relay responsive to the value of the quantity to be regulated, a timing relay controlled thereby and a motor controlling relay controlled by said timing relay, circuit controlling means for sealing said motor controlling relay in its circuit closing position upon operation of said motor operated mechanism for effecting continued operation of the mechanism throughout one operating step, means including a circuit controlling means actuated by operation of said motor operated mechanism for effecting operation of said motor controlling relay to its circuit interrupting position after each operating step of the mechanism, means controlled by said primary relay for effecting continuous operation of said mechanism, and means for selecting the one or the other of said last two named means for effecting either a continuous or a step-by-step operation of the mechanism.

6. In a step type regulating system, apparatus having a quantity to be regulated, regulating means including motor operated mechanism for regulating said quantity in steps, control means for said regulating means including a primary relay responsive to the value of the quantity to be regulated, a timing relay controlled thereby and a motor controlling relay controlled by said timing relay, circuit controlling means for sealing said motor controlling relay in its circuit closing position upon operation of said motor operated mechanism for effecting continued operation of the mechanism throughout one operating step, circuit closing means actuated by said timing relay for sealing said motor controlling relay in its circuit closing position, a holding contact actuated by said motor controlling relay for closing an energizing circuit for the timing relay in shunt to the circuit controlled by the primary relay, means having two operative positions for selectively conditioning the system for a selected one of two operating characteristics, said selecting means being effective in one operative position for maintaining the motor control relay closed until completion of the successive steps of operation as controlled by the primary relay, and effective in the other operative position for completing the energizing circuit for the timing relay through circuit controlling means actuated by operation of the motor operated mechanism for deenergizing the timing relay and interrupting the operation of the mechanism after each operating step independently of the position of said holding contact or said primary relay.

HERBERT L. PRESCOTT.